Patented Mar. 17, 1925.

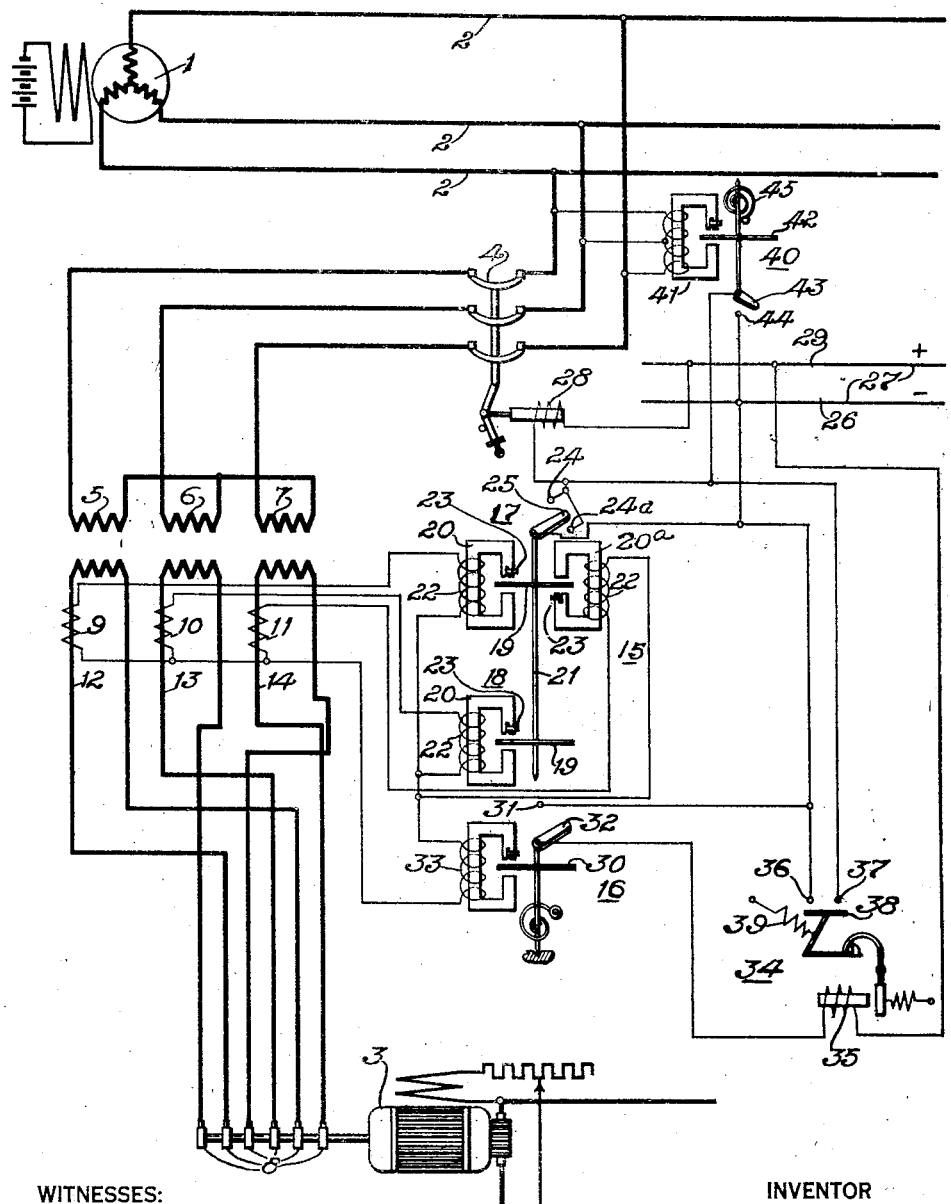

1,529,769

UNITED STATES PATENT OFFICE.

CHARLES A. BUTCHER, OF WILKINSBURG, PENNSYLVANIA, ASSIGNOR TO WESTINGHOUSE ELECTRIC & MANUFACTURING COMPANY, A CORPORATION OF PENNSYLVANIA.

RELAY SYSTEM.

Application filed October 9, 1920. Serial No. 415,770.

*To all whom it may concern:*

Be it known that I, CHARLES A. BUTCHER, a citizen of the United States, and a resident of Wilkinsburg, in the county of Allegheny and State of Pennsylvania, have invented a new and useful Improvement in Relay Systems, of which the following is a specification.

My invention relates to relay systems and particularly to systems for preventing damage to synchronous converters.

One object of my invention is to provide means for differentiating between the occurrence of an open phase on the high-tension side and on the low-tension side of a plurality of power transformers supplying energy to a synchronous converter.

Another object of my invention is to provide means for disconnecting the synchronous converter from a source of electromotive force, when any portion of the circuit supplying energy to the converter becomes open, to prevent the operation thereof on open phase.

Another object of my invention is to provide means, of the above-indicated character, that shall not merely trip the circuit interrupter upon the occurrence of an open phase in the source of electromotive force supplying a synchronous converter but that shall lock the interrupter in its open position if the open phase occurs on the low-tension side of power transformers that are connected between the source of energy and the synchronous converter.

In the operation of automatic synchronous-converter substations, a plurality of contactor relays, or switches, are employed to insure the correct sequence of operations that are necessary to start the synchronous converter. If the operation of the relays and the starting of the converter should be delayed, because of an open connection in the control circuit, various portions of the apparatus might become overheated and considerably damaged.

Also, if, after the converter has been started and has been operating, a conductor in the main supply circuit should become open circuited, the converter would be considerably overheated by operating as a single phase machine. It is desirable, therefore, upon the occurrence of an open circuit between the source of electromotive force and the synchronous converter, to disconnect the converter from that source.

If the fault should occur on the high-tension side of the power transformers, that are normally connected between a source of electromotive force and a synchronous converter, it is desirable merely to temporarily disconnect the converter from the source of electromotive force until that fault has been cleared. Such fault may be cleared at the generating station or at some point between the generating station and the substation. It is not necessary, therefore, for an operator to visit the substation to reset the interrupter since this may be taken care of automatically by the switching equipment in the substation.

If the fault should occur on the low-tension side of the power transformers, however, it is desirable that the interrupter shall not only be opened to disconnect the synchronous converter but that it shall also be locked in its open position to prevent the converter from being reconnected to the circuits so long as the open-phase condition obtains. Under such condition, it is preferable that the interrupter be locked in its open position until an operator may visit the substation to clear the fault.

United States patent application Serial No. 427,293, filed November 30, 1920, by S. G. Leonard and assigned to the Westinghouse Electric & Manufacturing Company, discloses a relay system for preventing synchronous converters from operating on open phase and embodies an induction relay comprising two induction-meter elements that are normally balanced in a neutral position. Each element comprises a rotatable disk member and a magnetizable core member having windings disposed thereon that are adapted to co-operate with each other to effect rotation of the disk member. Both disk members are mounted on a common shaft and one disk member has an additional magnetizable core member associated therewith for producing an opposing torque on the shaft.

Three current transformers are provided in three conductors that are normally traversed by currents that are separated from each other by one hundred and twenty electrical degrees. The currents bear such relationship towards each other as to balance and the forces produced thereby also balance. Under normal conditions, the two elements are so energized that a contact member controlled by the two disk members is maintained in a neutral position. Upon the occurrence of an open circuit between the secondary windings of the power transformers and the synchronous converter, the relay becomes unbalanced and the engagement of a plurality of contact members is effected to complete a control circuit for tripping the circuit interrupter.

In practicing my invention, I employ the above-mentioned relay and current transformers to control the actuation of a circuit interrupter when an open phase occurs in any portion of the circuit containing the windings of the converter. I provide, further, a second relay that is connected in the neutral conductor that joins the current transformers and the windings of the balance relay mentioned above. The balance relay will be energized and operated when an open phase occurs on either the high-tension side or the low-tension side of the power transformers. The latter relay, that is connected in the neutral conductor joining the transformers and the windings of the balance relay, will be energized only when a portion of the circuit on the low-tension side of the transformers is open circuited.

The two relays will thus differentiate between an open phase that occurs on the high-tension side of the current transformers and a similar fault that occurs on the low-tension side of the transformers. By means of a self-locking auxiliary relay, the interrupter may be locked in its open position after it has been opened by reason of the occurrence of an open phase on the secondary side of the power transformers. The reclosing of the interrupter may thus be prevented until the fault is cleared.

The single figure of the accompanying drawing is a diagrammatic view of an electrical circuit embodying my invention.

A source 1 of electromotive force is adapted to supply energy to a circuit 2 from which energy may be received by a synchronous converter 3 through a circuit interrupter 4 and a plurality of power transformers 5, 6 and 7.

The synchronous converter 3 is provided with a plurality of slip rings 8 that are respectively connected to the terminals of the internal windings thereof. The secondary windings of the power transformers 5, 6 and 7 are so connected to the slip rings 8 as to provide the correct phase rotation that is required to operate the converter. A plurality of current transformers 9, 10 and 11 are respectively connected in series with a plurality of conductors 12, 13 and 14, between the power transformers and the slip rings, that are normally traversed by currents which are spaced apart by one hundred and twenty electrical degrees from each other.

The current transformers 9, 10 and 11 are connected to a balance relay 15 and a relay 16 to energize the same upon the occurrence of an unbalance caused by an open phase in a portion of the circuit.

The relay 15 comprises two induction-meter elements 17 and 18 severally comprising a rotatable disk member 19 and a magnetizable core member 20. The disk members 19 are mounted on a common shaft 21 and the core members therefor are respectively provided with an energizing winding 22 and an auxiliary winding 23 that are adapted, when energized, to cause the disk members 19 to turn. A plurality of stationary contact members 24 and 24a are adapted to be engaged by a movable contact member 25 that is actuated by the disk members 19.

The induction-meter element 17 further comprises a magnetizable core member 20a that is adapted normally to develop a torque equal and opposite to the sum of the torques of the two core members 20.

When the contact member 25 engages the contact member 24 or 24a, a circuit is completed from the negative conductor 26 of a control circuit 27 through the trip coil 28 of the interrupter 4 to the positive conductor 29 of the control circuit 27 thereby energizing the winding 28 to trip the interrupter 4.

The relay 16 comprises a movable disk member 30 and a plurality of contact members 31 and 32, engagement of which is controlled by the disk member 30, and an energizing winding 33. The relay 16, when energized sufficiently to effect engagement of its contact members 31 and 32, effects the operation of an auxiliary relay 34 by completing a circuit from the negative conductor 26 of the control circuit 27, through the actuating winding 35 of the relay 34, to the positive conductor 29 of the control circuit 27.

The relay 34, when actuated, is adapted to effect and maintain engagement of its contact members 36 and 37, whereby a circuit is completed from the negative conductor 26 of the control circuit 27, through the contact members 36 and 37, a bridging member 38 and the tripping winding 28 of the interrupter 4, to the positive conductor 29 of the control circuit 27. A spring 39 maintains the bridging member 38 and the contact members 36 and 37 in engagement, thereby maintaining the trip coil 28 energized to prevent the reclosing of the interrupter 4.

In order to prevent the closing, or the reclosing, of the interrupter 4 while an open phase obtains in the supply circuit between the source 1 and the power transformers 5, 6 and 7, a phase relay 40 is provided, whereby the trip coil 28 of the interrupter 4 may be energized so long as the open-phase condition obtains.

The relay 40 comprises a magnetizable member 41 that is energized from the circuit, and a disk member 42 that is controlled thereby to maintain two contact members 43 and 44 disengaged so long as phase conditions are normal in the circuit. When phase conditions become abnormal, because of phase failure or because of an open phase, a resilient member 45 effects the engagement of the two contact members and completes the circuit that energizes the trip coil of the interrupter. The interrupter cannot, therefore, be reclosed while abnormal phase conditions obtain in the supply circuit.

When any portion of the circuit between the source 1 of electromotive force and the synchronous converter 3 is open, the interrupter 4 is tripped by the relay 15. If an open phase occurs between the source 1 of electromotive force and the primary windings of the power transformers 5, 6 and 7, the relay 15 will be energized to trip the interrupter 4. After the occurrence of an open phase and before the opening of the interrupter, the converter operates as a phase converter and supplies balanced voltages to the phase relay 40. However, as soon as the interrupter is tripped by the relay 15, the phase relay 40 is unbalanced and operates to maintain the trip coil of the interrupter energized to prevent the reclosing of the interrupter until the open-phase condition is corrected. When conditions become normal, the relay 40 returns to its initial position, and the interrupter may be reclosed.

If, however, the open circuit should occur in any portion of the circuit between the secondary windings of the power transformers 5, 6 and 7 and the windings of the synchronous converter 3, the interrupter 4 would be tripped by the relay 16 through the actuation of the relay 34.

When the relay 34 is actuated, the trip coil 28 of the interrupter 4 is so continuously energized as to prevent the reclosing of the interrupter until the relay 34 is reset. Since the relay 34 may be reset manually only, it will be necessary for an operator to clear the fault obtaining in the circuit between the power transformer and the synchronous converter before the converter may be reconnected to the supply circuit 2.

My invention is not limited to the specific arrangement and to the devices illustrated, as various modifications may be made therein without departing from the spirit and scope of my invention, as set forth in the appended claims.

I claim as my invention:

1. In an electric circuit, the combination with a source of electromotive force, an electrical apparatus and a plurality of power transformers connected therebetween and a circuit interrupter therefor, of means for distinguishing between the occurrence of a fault on the primary or the secondary side of the power transformers and for controlling the interrupter accordingly.

2. In an electric circuit, the combination with a source of electromotive force, an electrical apparatus and a plurality of power transformers connected therebetween and a circuit interrupter therefor, of means for actuating the interrupter upon the occurrence of phase failure, and means for preventing the resetting of the interrupter only if the failure occurs on the secondary side of the transformers.

3. In an electric circuit, the combination with a source of electromotive force, an electrical apparatus and a plurality of power transformers connected therebetween, of means selectively energized in accordance with the occurrence of a fault on the primary or the secondary side of the power transformers for controlling the interrupter in accordance with the location of the fault.

4. In an electric circuit, the combination with a source of electromotive force, an electrical apparatus and a plurality of power transformers connected therebetween and a circuit interrupter therefor, of means for actuating the interrupter upon the occurrence of a phase failure in the circuit and means for preventing the resetting of the interrupter only when the failure occurs in a predetermined portion of the circuit.

5. In an electric circuit, the combination with a source of electromotive force, an electrical apparatus and a plurality of power transformers connected therebetween and a circuit interrupter therefor, of means actuated only upon the occurrence of an open phase on the secondary side of the power transformers for preventing the resetting of the interrupter.

6. In an electric circuit, the combination with a source of electromotive force, an electrical apparatus and a plurality of power transformers connected therebetween and a circuit interrupter therefor, of a normally balanced relay for effecting the actuation of the interrupter upon the occurrence of a phase failure in the circuit and a latching relay energized when the phase failure occurs on the secondary side of the power transformers for preventing the resetting of the interrupter.

7. In an electric circuit, the combination with a source of electromotive force, a plurality of power transformers connected thereto, of means selectively responsive to the occurrence of an open phase on the primary or the secondary side of the power transformers for controlling the connection of the transformer to the circuit.

8. In an electric circuit, the combination with a source of electromotive force, a polyphase synchronous converter, a plurality of power transformers connected therebetween and a circuit interrupter therefor, of a relay energized upon the occurrence of an open phase in the circuit for actuating the interrupter, and means selectively actuated when the open phase occurs on the secondary side of the transformers for preventing the resetting of the interrupter.

9. In an electric circuit, the combination with a source of electromotive force, a synchronous converter and a power transformer therebetween, of means energized upon the occurrence of an open phase in the circuit for indicating on which side of the transformer the fault has occurred.

In testimony whereof, I have hereunto subscribed my name this 6th day of October, 1920.

CHARLES A. BUTCHER.